US006205780B1

(12) United States Patent
Zervas

(10) Patent No.: US 6,205,780 B1
(45) Date of Patent: Mar. 27, 2001

(54) LOW-LOSS DRIVE SYSTEM FOR A PLURALITY OF HYDRAULIC ACTUATORS

(75) Inventor: Bernhard Zervas, Oberursel (DE)

(73) Assignee: Aeroquip-Vickers International GmbH, Baden-Baden (DE)

( * ) Notice: Subject to any disclaimer, the term of this patent is extended or adjusted under 35 U.S.C. 154(b) by 0 days.

(21) Appl. No.: 09/101,502

(22) PCT Filed: Dec. 21, 1996

(86) PCT No.: PCT/EP96/05801

§ 371 Date: Feb. 16, 1999

§ 102(e) Date: Feb. 16, 1999

(87) PCT Pub. No.: WO97/25532

PCT Pub. Date: Jul. 17, 1997

(30) Foreign Application Priority Data

Jan. 10, 1996 (DE) .............................................. 196 00 650
Oct. 12, 1996 (DE) .............................................. 196 42 163

(51) Int. Cl.[7] ...................................................... F16D 31/02
(52) U.S. Cl. ................................................ 60/421; 60/423
(58) Field of Search ............................. 60/421, 423, 428, 60/429, 430, 465, 486

(56) References Cited

U.S. PATENT DOCUMENTS 4,008,571 * 2/1977 Evans .................................... 60/423
4,070,857 * 1/1978 Wible ..................................... 60/422
4,237,688 * 12/1980 Demmers ............................... 60/486
4,378,675 * 4/1983 Otto ....................................... 60/421
4,635,439 * 1/1987 Wible ..................................... 60/421
5,477,677 * 12/1995 Krnavek ................................ 60/428
5,481,873 1/1996 Minoru .

FOREIGN PATENT DOCUMENTS 2920235 1/1980 (DE) .
4030950 4/1992 (DE) .
0071228 2/1983 (EP) .
0103727 3/1984 (EP) .
0314660 5/1989 (EP) .
0665381 8/1995 (EP) .
2203438 5/1974 (FR) .
2211563 7/1974 (FR) .
2024953 1/1980 (GB) .
2294977 5/1996 (GB) .

OTHER PUBLICATIONS

"10–7 Counterbalance, Sequence, and Unloading Valves" in Pippenger et al—Industrial Hydraulics, (McGraw–Hill, New York, 1979) pp. 266–269.*
Patent Abstracts of Japan vol. 96, No. 9 (for Publication 08–133688 May 28, 1996) Sep. 30, 1996.

* cited by examiner

*Primary Examiner*—F. Daniel Lopez
(74) *Attorney, Agent, or Firm*—Dinsmore & Shohl LLP

(57) ABSTRACT

The invention related to a drive system with at least two hydraulic actuators, which are supplied with a hydraulic fluid by means of at least one pump. The drive system comprises at least one further second pump (15') arranged parallel to the first pump (15), wherein the pumps are bi-directionally speed-regulated, and a valve arrangement (59) with one inlet per pump (61.1, 61.2), wherein each one of the inlets is connected to a pump (15), and with a number of outlets (63.1, 63.1', . . . 63.4, 63.4') which are connected to the actuators (1.1 . . . 1.4), wherein the inlets (61) can be connected to the outlets (63) in a pre-determined manner.

17 Claims, 4 Drawing Sheets

LOW-LOSS DRIVE SYSTEM FOR A PLURALITY OF HYDRAULIC ACTUATORS

DESCRIPTION

The invention relates to a drive system with at least two hydraulic actuators which are supplied with a hydraulic fluid by means of at least one pump.

From the DE 40 30 950 A1 it is known to provide a hydraulic double-acting actuator with two pumps, wherein in each instance only one of the two pumps is operative with regard to the movement of the actuator. Furthermore, as usual, loss-entailing regulating valves are used to control the actuator, and the pumps are driven at a largely constant speed, in one direction of rotation, by an internal combustion engine.

Machines with several actuators which must perform different operating movements in a completely or partially sequential manner, are usually supplied with hydraulic energy by means of a regulating valve circuit, that of one or several pumps which are driven at a constant speed. The technical disadvantage of these systems is a low efficiency since, due to the principle, the regulating valves convert hydraulic energy into thermal energy.

It is the object of the present invention to create a drive system which has a simple construction, outstanding regulating properties and at the same time avoids the principle-related throttle losses of regulating valves and, accordingly, operates with a very good efficiency.

According to the invention a hydraulic actuator can be controlled or regulated by two bi-directional, speed-regulated pumps without any regulating valve and, accordingly, in an extremely low-loss way in four-quadrant operation. Because the two pumps have one valve circuit, in particular in the case of sequential operations the two pumps can both be assigned to the active actuator or, in the case of single-action operation, to two actuators. The valve arrangement permits in an advantageous manner the use of only two pumps, which via the valve arrangement can be connected to the individual actuators in a low-loss manner. It is possible, therefore, to dispense with a greater number of pumps, which simplifies the construction and makes it more economical. The valve arrangement essentially serves to produce the low-loss connection between the pumps and the actuators, wherein the regulating functions are ensured directly by the pumps.

In an advantageous embodiment of the invention the valve arrangement has several switching positions, in which in each instance one actuator in the double-acting operating mode is connected to both pumps.

In another advantageous embodiment the valve arrangement has switching positions which permit the two pumps to be connected to different actuators, so that, therefore, two actuators can be operated simultaneously.

Preferably, the valve arrangement has switching positions in which the two pumps can be connected in parallel and jointly supply one actuator.

In another advantageous embodiment the valve arrangement can be provided with seat valves so as to fix in a leakage-free manner the actuators which are not being driven at the time.

In another advantageous embodiment the valve arrangement for single-acting actuators can be provided with holding valves.

Preferred is an embodiment of the drive which is characterised in that at least one of the pumps has a constant displacement volume. Such pumps are of a particularly simple construction, resulting in an economical realisation which is not susceptible to problems.

Furthermore preferred is an embodiment of the drive which comprises a control which co-operates with the drive, is designed as a regulating circuit and includes at least one sensor which detects the position, speed and/or acceleration of the actuator and/or the pressure acting on the actuator or the forces exerted by the actuator. In this way it is possible to adapt the drive in a highly variable manner to the actual circumstances.

With the abovementioned advantageous embodiments it is also possible, of course, to use more than two pumps for driving several actuators.

Further embodiments can be noted from the other subclaims. In the following the invention will be explained in greater detail with reference to the drawing, wherein:

In the following it is assumed that the drive co-operates with a double-acting piston arrangement. However, it can in general be combined with any hydraulic actuators, for example also with single-acting actuators, hydraulic motors or gear arrangements.

Figure 1:
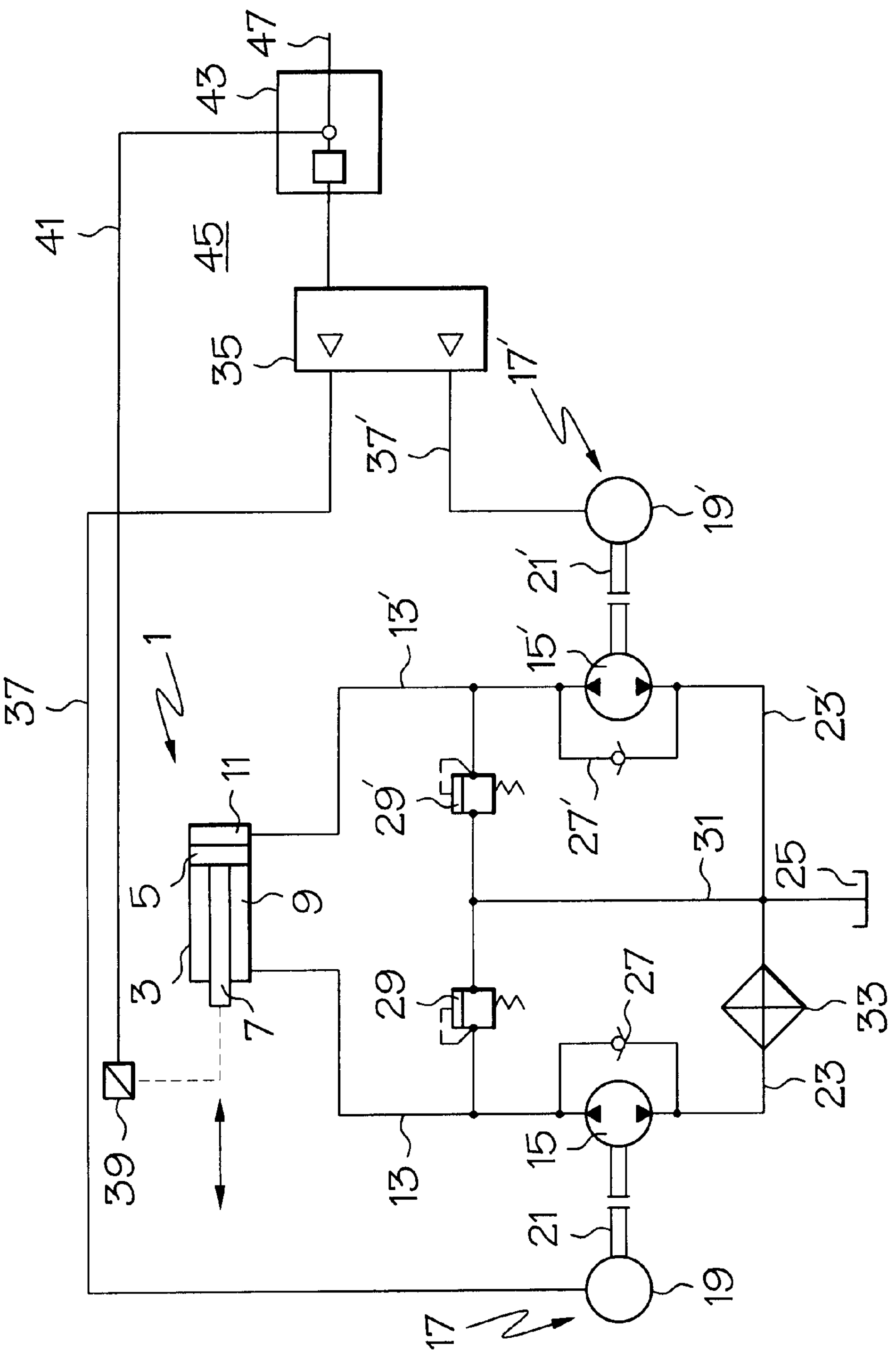
FIG. 1 shows a basic circuit diagram of the drive.

FIG. 1 shows an actuator 1 in the form of a hydraulic double-acting piston arrangement, which has a piston 5 moving in a cylinder 3, a piston rod 7 being attached to the piston 5. The piston 5 and piston rod 7 are positioned in the cylinder 3 in such a way that two pressure chambers 9 and 11 are formed.

The first pressure chamber 9 is connected by a feed line 13 to a pump 15, which has a drive assembly 17. This comprises in this case an electric motor 19, which by way of a shaft 21, which is only indicated here, is connected to the first pump 15. The first pump 15 is connected by a supply line 23 to a tank 25. Parallel to the pump 15 a valve 27 is provided, which on the one side is connected to the supply line 13 and on the other side to the supply line 23. The valve 27 is in this case a non-return valve which is arranged in such a way that, in the event of an under-pressure in the supply line 13, the hydraulic medium present in the tank 25 can be sucked up, also when the first pump 15 is not driven.

Connected to the supply line 13 is an over-pressure valve 29, also called a relief valve, which via a return line 31 is connected to the tank 25. An in this case identically constructed supply system is provided for the second pressure chamber 11: Via a supply line 13' a second pump 15' conveys a hydraulic medium from the tank 25. To this end the second pump 15' is connected via a supply line 23' to the tank 25. The second pump 15' is provided with a drive assembly 17'. It is possible to drive both pumps 15 and 15' by one single motor, for example the electric motor 19. With the exemplified embodiment illustrated here, the drive assembly 17' comprises a second electric motor 19', which via a shaft 21' indicated here drives the second pump 15'. Parallel to the second pump 15', a valve is again provided here, which is in the form of a non-return valve 27' and is arranged in such a way that in the event of an under-pressure in the supply line 13' hydraulic medium can be sucked up via the supply line 23' from the tank 25. The supply line 13' is connected via an over-pressure valve 29' to the return line 31 which leads to the tank 25.

The hydraulic system associated with the actuator 1 may be provided with a cooler 33, which here is integrated in the supply line 23 to the first pump 15. It is also possible to install this cooler 33 at any point in the hydraulic system. Finally, it would also be possible to provide one or several of the supply lines with cooling ribs to eliminate excess heat.

When via the first pump 15 hydraulic medium is conveyed from the tank 25 into the first pressure chamber 9, the piston 5 moves to the right inside the cylinder 3. As a result also the piston rod 7 is moved to the right. Due to the movement of the piston 5, the pressure in the second pressure chamber 11 increases. As a result thereof the hydraulic medium present in the pressure chamber 11 is forced back via the supply line 13' to the second pump 15'. The second pump 15' is now operated as a motor which drives the coupled electric motor 19. The latter now works as a generator and converts the drive energy into electric energy and feeds this back into the electric system of the drive, where it can be used again to feed the first electric motor 19. Depending on the direction of movement of the piston 5, one of the pumps 15, 15' acts as motor and the associated electric motor 19, 19' as generator, which improves the efficiency of the drive considerably.

A movement of the piston 5 and piston rod 7 in the opposite direction occurs when a hydraulic medium or hydraulic oil is supplied by the second pump 15' to the second pressure chamber 11. The to and fro movement of the piston rod 7 is indicated in the Figure by a double arrow.

The drive for the actuator 1 illustrated in FIG. 1 in addition comprises a control 35 which via control lines 37 and 37' is connected to the electric motors 19 and 19'.

The actuator 1 is associated with at least one sensor 39, the output signals of which are fed via a signal line 41 to an evaluation circuit 43, which together with the control 35 forms a regulating circuit 45. Via a line 47 at least one external signal can be fed to the evaluation circuit 43, by means of which the drive for the actuator 1 can be influenced.

The sensor 39, which may comprise an analogue/digital converter, is able to detect the most varying physical parameters of the actuator 1, for example its position, the speed and/or acceleration of the piston 5 or piston rod 7, respectively, the pressure prevailing in the supply lines 13 and/or 13' and/or the forces exerted by the actuator 1. It is also possible for physical parameters of the actuator 1 to be determined indirectly by sensors in the supply lines 13 and 13', respectively, in the control 35 and/or the evaluation circuit 43 or the electric motors 19 and 19'. One or several sensors, for example flow or speed sensors, can also be integrated in the control 35 or in the electric motors 19 and 19'. In that case the external sensor 39 may optionally be omitted and a modular construction of the drive can be realised.

FIG. 1 shows that in total one drive can be realised for an actuator 1 which permits a two- or four-quadrant operation. This is possible both when the control 35 is provided in the form of a control circuit or when, as illustrated in the Figure, it is a regulating circuit, for example a single-loop regulating circuit. The regulating circuit may comprise continuous regulators, for example PID and/or condition regulators with/without observers or discontinuous regulators. It may also be constructed in such a way that one or several of the physical parameters are regulated in parallel or sequentially. To exclude permanent regulating errors of the regulating circuit or regulating system, preferably regulators with integrated parts are used, i.e. regulators with I-, PI- or PID-behaviour. The regulating circuit can be realised by means of the analogue or digital technique or by a combination of analogue and digital techniques.

In FIG. 1 the pumps 15 and 15' are provided as fixed-displacement pumps, which means that they have a constant displacement volume. It is also possible that one or both the pumps are variable displacement pumps, in which case one or two displacement chambers can be provided. What is important is that also a four-quadrant drive can be realised without providing any throttle valves in the feed lines 13 and 13'. As a result the drive for the actuator 1 operates in a particularly low-loss manner. From the above it is also clear that the drive can be realised very simply and accordingly economically, seeing that also for a four-quadrant drive only pumps with a constant displacement volume are required, i.e. pumps that can be realised relatively economically. Only one drive is required for the pumps, which permits variable deliveries. This is possible already with the aid of one single electric motor which has a variable speed and is controlled by way of the control 35. The drive for the actuator 1 can, therefore, be simplified even further compared to the illustration in the Figure, in which case nevertheless a four-quadrant drive can be realised.

The drive illustrated here also meets high safety requirements seeing that on the one hand over-pressure valves 29, 29' are provided and on the other hand valves 27, 27' in the form of after-suction valves. The valves 27, 27', 29 and 29' have exclusively a safety function and are not required for the normal operation of the drive, i.e. they are inactive.

A particularly simple design can be achieved in that the electric motors 19 and 19' with the associated pumps 15 and 15' can be constructed as a unit. The delivery of the pumps is obtained by adapting the motor speed or the number of revolutions, which is possible with the aid of the control 35. The latter can, in addition, be integrated in the unit consisting of motor and pump, resulting in a particularly compact construction. Seeing that the actuator is clamped between the two pumps 15 and 15', a high rigidity is ensured.

From the illustration it can be noted that the areas of the piston 5 which are acted upon by the pressure prevailing in the pressure chambers 9 and 11, have different sizes. In the first pressure chamber 9, because of the piston rod 7, there is an annular area which is smaller than the cross-sectional area of the piston 5 which is acted upon by the pressure prevailing in the second pressure chamber 11. For example, the size ratio or area ratio of the piston areas acted upon by pressure may be 2:1. To compensate for this, the delivery volumes of the pumps 15 and 15' can be adapted to this area ratio. As a result thereof the electric motors 19 and 19' can again be operated at the same speed. However, it is obvious that also pumps with the same delivery volume can be used which are operated at different drive speeds.

By using the sensor 39 the simple drive for the actuator can be designed for a position and pressure regulation and/or for a speed and pressure regulation.

When for at least one of the pumps 15, 15' a variable displacement pump is used, the drive for the actuator can, in addition, besides the speed-dependent delivery regulation by the electric motors 19 and 19' respectively, also be controlled by changing the displacement volume of the pumps. It is clear, therefore, that the drive for the actuator 1 can be changed in many ways and can be adapted to different applications.

Figure 2:
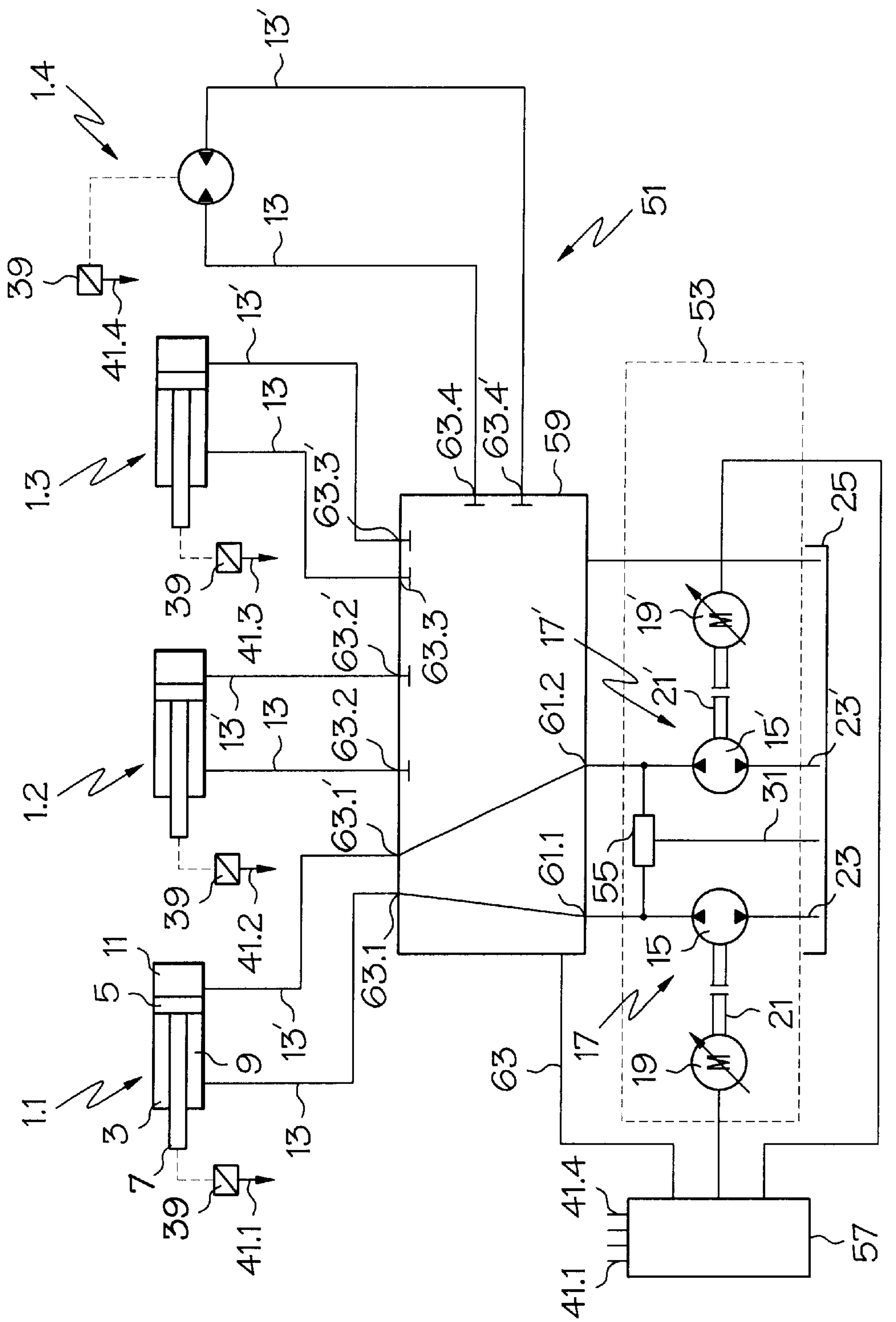
FIG. 2 shows a basic circuit diagram of a drive system with several actuators.

In FIG. 2 a drive system 51 is illustrated, which consists of several, in the present case four actuators 1.1 to 1.4. Such a drive system 51 is part of a machine which performs different operating movements in a completely or partially sequential manner.

Each of the actuators 1.1 to 1.3 is a hydraulic double-acting piston cylinder, as already described in connection with FIG. 1. For that reason they will not be described again. Only the actuator 1,4 is different insofar as this is a hydraulic motor.

The same as with the actuator 1 described in FIG. 1, each of the four actuators 1.1 to 1.4 is supplied, via feed lines 13 and 13', with a hydraulic fluid which is delivered by a pump unit 53, surrounded by a broken line, from a tank 25. The same as with the exemplified embodiment of FIG. 1, the pump unit 53 has two pumps 15, 15', which are driven with the shaft 21 and 21', respectively, by the electric motor 19 and 19', respectively. The two feed lines 23, 23' of the two pumps 15, 15' are connected to the tank 25.

For the sake of clarity, the non-return valves 27, 27', as well as the over-pressure valves 29, 29', illustrated in FIG. 1, are shown here as a switch block 55. However, the mode of functioning is the same as that of the valves 27 and 29.

Also for the sake of clarity, a regulating and control unit 57 is shown simply as a function block. The regulating unit 57 comprises for each actuator a regulating circuit 45, which includes a control 35 and an evaluation circuit 43. The evaluation circuit 43 associated with an actuator receives the signal supplied by the sensor 39 via the line 41. The connection between the abovementioned components is the same as that described with reference to FIG. 1, so that at this point no further details will be given of the exact mode of functioning.

FIG. 2 furthermore shows a valve arrangement 59 which is provided in the feed lines 13 coming from the two pumps 15, 15' and leading to the actuators. The valve arrangement has two hydraulic inlets 61.1 and 61.2, the first inlet 61.1 being connected to the pump 15 and the second inlet 61.2 to the pump 15'. In addition to these two inlets, for every actuator 1.1 to 1.4 two outlet 63.1, 63.1' to 63.4, 63.4' are provided. The outlets 63.1 to 63.4 are each connected to the feed line 13 of an actuator 1.1 to 1.4, whereas the outlets 63.1' to 63.4' are each connected to the feed line 13' of an actuator.

The valve arrangement 59 comprises several, in the present exemplified embodiment preferably four switching positions, in which the inlets 61.1 and 61.2 are connected in a low-loss manner to predetermined outlets 63.

In the switching position of the valve arrangement 59 illustrated in FIG. 2, the inlet 61.1 is connected to the outlet 63.1 and the inlet 61.2 to the outlet 63.1'. As a result the pump 15 is connected to the feed line 13 and the pump 15' to the feed line 13'. The mode of functioning of the actuator 1.1 in co-operation with the regulating device 57 and the pump unit 53 corresponds to the mode of functioning of the arrangement in FIG. 1, for which reason another description will be dispensed with at this point.

The switching position of the valve arrangement 59 can be changed, for example, via a control line 63 by the regulating unit 57. In the present exemplified embodiment the pump unit 53 is connected in the switching position II to the actuator 1.2, in the switching position III to the actuator 1.3 and in a switching position IV to the hydraulic motor 1.4. Naturally, also other associations of the pump unit 53 and the actuators per switching position are possible.

Figure 3:
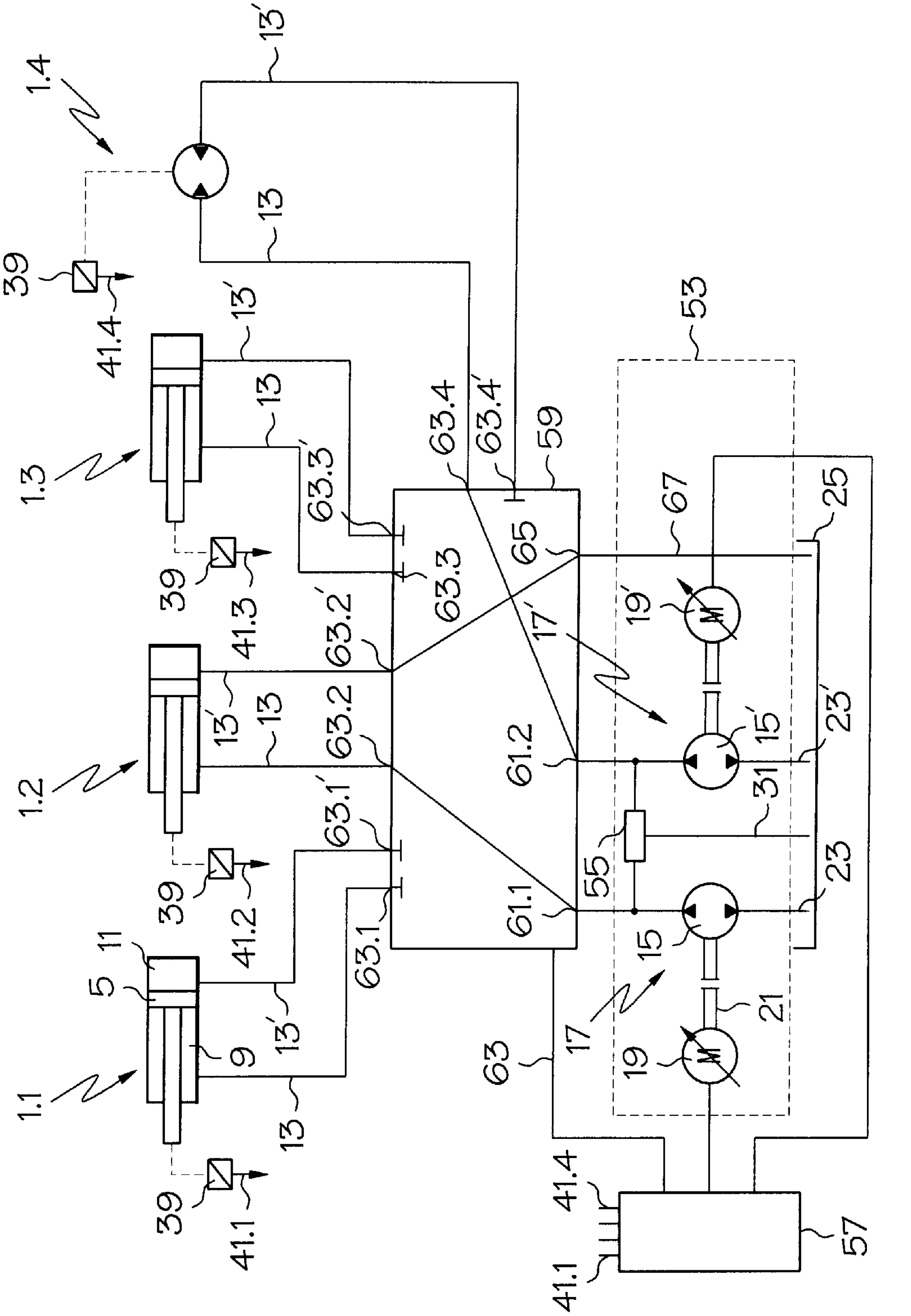
FIG. 3 illustrates a second exemplified embodiment of a drive system with several actuators.

FIG. 3 shows an exemplified embodiment which corresponds substantially to the aforementioned exemplified embodiment according to FIG. 2. For this reason another description of the parts marked with the same reference numerals will be dispensed with. The only difference is that the valve arrangement 59 permits a different association of the inlets 61.1 and 61,2 with the outlets 63.1 to 63.4.

Thus, in the illustrated switching position of the valve arrangement 59 the inlet 61.1 is connected to the outlet 63.2 and the inlet 61.2 to the outlet 63.4. In addition the valve arrangement 59 has an outlet 65, which via a line 67 leads to the tank 25. This outlet 65 is connected on the one side to the outlet 63.2' and on the other side to the outlet 63.4'. With the aid of these connections it is possible to use the pump 15 for driving the actuator 1.2 and the pump 15' for driving the hydraulic motor 1.4. By using reversible pumps 15, 15', it is furthermore possible to bring about a movement of the actuators in both directions.

Depending on the application, the valve arrangement 59 can be constructed in such a way that a switching position is provided for every desired operation combination of two actuators.

Figure 4:
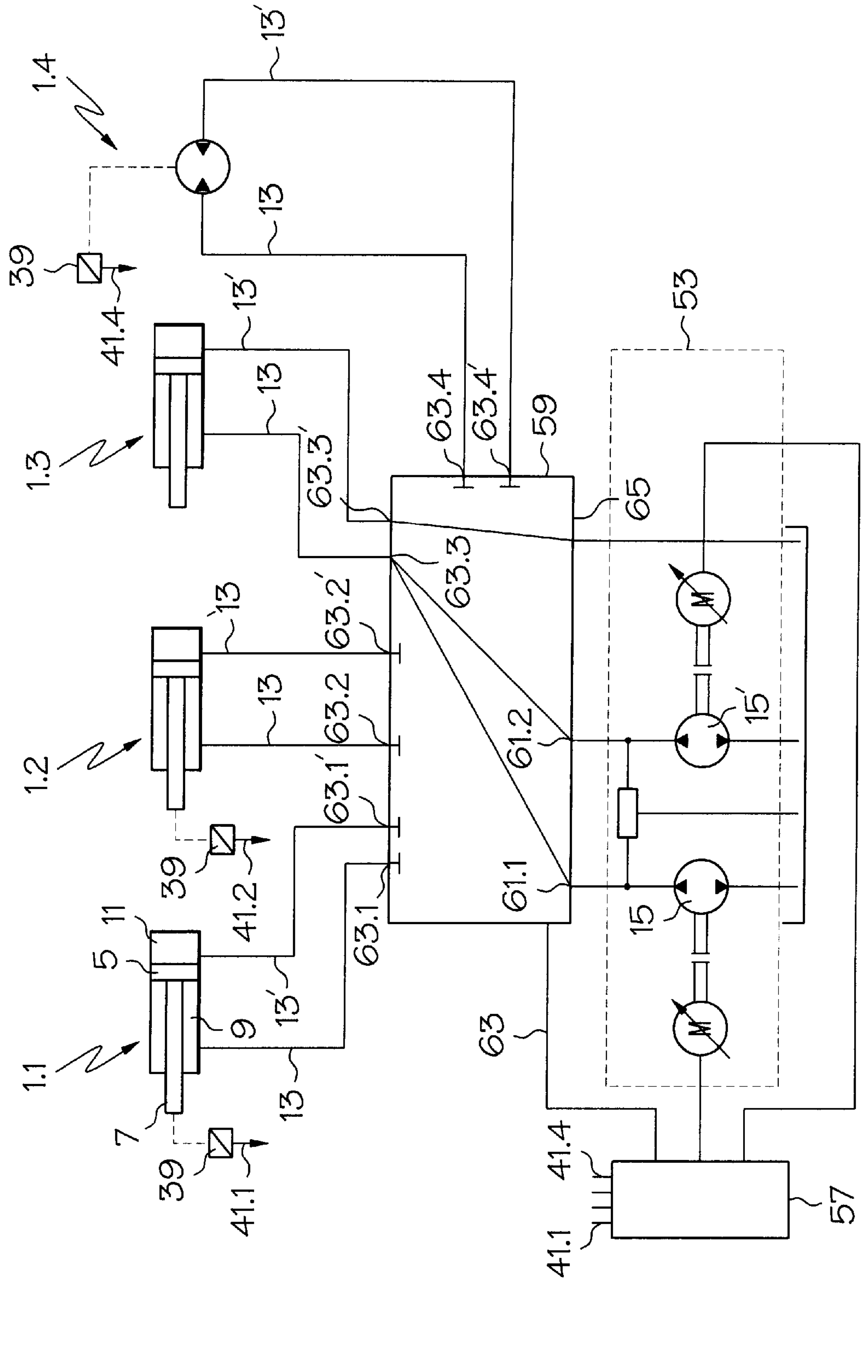
FIG. 4 illustrates a third drive system with several actuators.

In FIG. 4 another exemplified embodiment is illustrated, the basic construction of which corresponds to the exemplified embodiment shown in FIG. 2. For this reason another description of the parts marked with the same reference numerals will be dispensed with here.

In the present exemplified embodiment, with the aid of the valve arrangement 59 another mode of operation is made possible. By connecting the two inlets 61.1, 61.2 to one outlet 63, the two pumps 15, 15' can be switched in parallel to supply one actuator 1.

FIG. 4 shows that in the illustrated switching position of the valve arrangement 59 the inlets 61.1 and 61.2 are connected to the outlet 63, whereas the outlet 63.3' is connected to the outlet 65. As a result thereof both pumps 15, 15' supply hydraulic fluid via the feed line 13 to the actuator 1.3 for its actuation. In the other switching positions of the valve arrangement 59 the actuators 1.1, 1.2 and 1.4 can then be connected to the two pumps 15, 15'.

Naturally, the connections of the pumps 15, 15' to the feed lines 13, 13' of the individual actuators illustrated in FIGS. 2 to 4 can be combined at will by a suitable construction of the valve arrangement 59. Thus, it is entirely possible in a switching position I to operate the actuator 1.1 in accordance with FIG. 2, in the switching position II to use both pumps for driving the actuators 1.2 and 1.4 and in a switching position III to supply the actuator 1.3 via both pumps 15, 15' in accordance with FIG. 4.

Furthermore, it is also conceivable to provide a further pump unit in addition to the pump unit 53 illustrated in the exemplified embodiment, so that several actuators can be operated.

What is claimed is:

1. A drive system comprising:

at least two hydraulic actuators;

a first pump and at least one further pump that are configured to supply hydraulic fluid to the actuators, wherein the pumps are bi-directionally speed-regulated; and a valve arrangement having one inlet for each pump and a number of outlets connected to the actuators, wherein each of the inlets is connected to a pump and wherein the inlets are connected to the outlets in a predetermined manner;

wherein, in a first switching position of the valve arrangement, a first inlet of the valve arrangement is connected to a first outlet of the valve arrangement and a second inlet of the valve arrangement is connected to a second outlet of the valve arrangement, wherein the first and second outlets are connected to the same actuator.

2. The drive system as recited in claim 1, wherein the valve arrangement is switchable between the first switching position and a second switching position, wherein, in the second switching position, the first and second inlets of the valve arrangement are connected to one outlet of the valve arrangement such that both pumps jointly supply one actuator.

3. The drive system as recited in claim 1, wherein the valve arrangement is switchable between the first switching position and a second switching position, wherein, in the second switching position, the two pumps are connected to different actuators.

4. The drive system as recited in claim 1, wherein at least one of said pumps has a fixed displacement volume.

5. The drive system as recited in claim 1, wherein at least one of said pumps comprises a variable displacement pump.

6. A drive system comprising:

at least two hydraulic actuators;

a first pump and at least one further pump which are configured to supply hydraulic fluid to the actuators, wherein the pumps are bi-directionally speed-regulated; and a valve arrangement having one inlet for each pump and a number of outlets connected to the actuators, wherein each of the inlets is connected to a pump and wherein the inlets are connected to the outlets in a predetermined manner;

wherein, in a first switching position of the valve arrangement, the two pumps are connected to different actuators;

wherein the valve arrangement is switchable between the first switching position and a second switching position; and wherein in the second switching position, both pumps are connected jointly to one outlet, in order to supply one actuator.

7. The drive system as recited in claim 6, wherein at least one of said pumps comprises a variable displacement pump.

8. The drive system as recited in claim 6, wherein each of the two pumps has a separate drive assembly.

9. The drive system as recited in claim 8, further comprising a control circuit configured to control the drive assemblies.

10. The drive system as recited in claim 9, wherein the control circuit comprises at least one sensor adapted to detect a parameter of at least one actuator.

11. The drive system as recited in claim 6, further comprising:

a regulating circuit configured to control at least one parameter of at least one actuator.

12. The drive system as recited in claim 6, further comprising:

at least one electric motor adapted to drive at least one of the pumps, the electric motor having variable speed for each direction of rotation.

13. A drive system comprising:

at least two hydraulic actuators;

a first pump and at least one further pump which are configured to supply hydraulic fluid to the actuators, wherein the pumps are bi-directionally speed-regulated; and a valve arrangement having one inlet for each pump and a number of outlets connected to the actuators, wherein each of the inlets is connected to a pump and wherein the inlets are connected to the outlets in a predetermined manner;

wherein each of the pumps is associated with a separate electric motor adapted to drive the pump, each electric motor having a variable speed for each direction of rotation;

wherein the valve arrangement is switchable between a first switching position and a second switching position;

wherein, in the first switching position of the valve arrangement, the two pumps are connected to different actuators, and in the second switching position of the valve arrangement, both pumps are connected jointly to one outlet, in order to supply one actuator.

14. The drive system as recited in claim 13, wherein at least one of said pumps comprises a variable displacement pump.

15. The drive system as recited in claim 13, further comprising at least one control circuit configured to control the electric motors.

16. The drive system as recited in claim 15, wherein the control circuit comprises at least one sensor adapted to detect a parameter of at least one actuator.

17. The drive system as recited in claim 13, further comprising:

a regulating circuit configured to control at least one parameter of at least one actuator.

* * * * *